United States Patent
Aoki et al.

(10) Patent No.: US 7,445,140 B2
(45) Date of Patent: Nov. 4, 2008

(54) PRODUCTION METHOD OF ULTRASONIC WELD ASSEMBLY

(75) Inventors: Yuuichi Aoki, Chita-gun (JP); Shin-ichi Matsuoka, Toyama (JP)

(73) Assignee: Denso Corporation, Kariya (JP)

( * ) Notice: Subject to any disclaimer, the term of this patent is extended or adjusted under 35 U.S.C. 154(b) by 621 days.

(21) Appl. No.: 11/194,406

(22) Filed: Aug. 1, 2005

(65) Prior Publication Data

US 2006/0027305 A1    Feb. 9, 2006

(30) Foreign Application Priority Data

Aug. 6, 2004 (JP) ............... 2004-230865
Mar. 31, 2005 (JP) ............... 2005-102274

(51) Int. Cl.
*B23K 1/06* (2006.01)
*B23K 5/20* (2006.01)
*B23K 37/00* (2006.01)
*B23K 20/10* (2006.01)

(52) U.S. Cl. .................... 228/110.1; 228/1.1
(58) Field of Classification Search ............. 228/110.1, 228/1.1; 156/73.1–73.4, 580.1
See application file for complete search history.

(56) References Cited

U.S. PATENT DOCUMENTS 6,320,181 B1 * 11/2001 Noji et al. ............. 250/214 VT

FOREIGN PATENT DOCUMENTS

| JP | 11-077337 | 3/1999 |
| JP | 2001-246479 | 9/2001 |
| JP | 2003-080378 | 3/2003 |

* cited by examiner

*Primary Examiner*—Jerry Lorengo
*Assistant Examiner*—Megha Mehta
(74) *Attorney, Agent, or Firm*—Harness, Dickey & Pierce, PLC

(57) ABSTRACT

When a weld area of weld surface between a flange portion $3a$ of a pipe 3 and a flange portion $4a$ of a pipe connection member 4 is S and total energy consumed on the weld surface is Et, ultrasonic welding is carried out to produce said ultrasonic weld assembly in such a manner that an energy density E defined as the quotient obtained by dividing the total energy Et by the weld area S satisfies the relation $26.69e^{-0.3708P} < E < 240.9e^{-0.1445P}$ with a surface pressure P on the weld surfaces of the flange portion $3a$ and the flange portion $4a$. Preferably, ultrasonic welding is carried out in such a manner that the energy density E satisfies the relation $133.45e^{-0.3708P} < E < 240.9e^{-0.1445P}$.

8 Claims, 5 Drawing Sheets

PRODUCTION METHOD OF ULTRASONIC WELD ASSEMBLY

BACKGROUND OF THE INVENTION

1. Field of the Invention

This invention relates to a production method of an ultrasonic weld assembly to which ultrasonic welding for welding work, by using ultrasonic oscillation, is applied.

2. Description of the Related Art

Japanese Unexamined Patent Publications Nos. 2003-80378, 2001-246479 and 11-77337, for example, have proposed ultrasonic welding methods in the past. According to such ultrasonic welding methods, an oscillator is made to oscillate, by a high frequency voltage, while a first member is pressed to a second member. Oscillations from the oscillator or a resonance horn connected to the oscillator causes oscillation of the first member or the second member and heat of friction generating at their contact surface weld them together. Consequently, a pipe as the first member and a pipe connection member as the second member, for example, can be hermetically welded.

However, these ultrasonic welding methods do not at all clarify the condition of ultrasonic welding required for conducting air-tight welding. Therefore, insufficient air-tight welding may occur in some cases by merely conducting the ultrasonic welding methods disclosed in these patent documents.

SUMMARY OF THE INVENTION

In view of the problem described above, the invention aims at providing a production method, of an ultrasonic weld assembly, capable of precisely conducting air-tight welding by ultrasonic welding.

According to one aspect of the invention, there is provided a production method, of a ultrasonic weld assembly, by conducting ultrasonic welding by ultrasonically oscillating a first member (3, 3a) and a second member (4, 4a) each made of a metal, wherein, when a weld area of the weld surface between the first member (3, 3a) and the second member (4, 4a) is S and total energy consumed on the weld surface is Et during the ultrasonic welding, ultrasonic welding is carried out in such a manner that a function E(P, t) of an energy density E defined as the quotient obtained by dividing the total energy Et by the weld area S, which function E(P, t) is defined for a surface pressure P of the weld surfaces of the first member (3, 3a) and the second member (4, 4a) and a sheet thickness t of the weld portion of the first member (3, 3a) and the second member (4, 4a), satisfies the relation $Emin(P, t) = J \times P^{-n} < E(P, t) < Emax(P, t) = L \times P^{-m}$ where $J = 0.2 \times 10^5 t^{2.86}$, $n=3.5$, $L=10^6 t^{4.33}$ and $m=2.5$.

When the energy density E is so set as to satisfy the relation with respect to the surface pressure P and the sheet thickness t, a desired welding rate can be acquired and a ultrasonic weld assembly having excellent air-tight welding can be produced.

In this case, when the sheet thickness t is 0.3 mm, for example, the effect described above can be acquired by conducting ultrasonic welding so that the energy density E satisfies the relation $26.69 e^{-0.3708P} < E < 240.9 e^{-0.1445P}$ with respect to the weld surface of the first member (3, 3a) and the second member (4, 4a).

In the invention, a welding rate becomes high and a ultrasonic weld assembly having more excellent air-tight welding can be produced when ultrasonic welding is carried out in such a manner that the function E(P, t) of the energy density E satisfies the relation $Emin(P, t) = K \times P^{-n} < E(P, t) < Emax(P, t) = L \times P^{-m}$ where $K = 10^5 t^{2.86}$.

When the sheet thickness is 0.3 mm, for example, ultrasonic welding is carried out in such a manner as to satisfy the relation $33.45 e^{-0.3708P} < E < 240.9 e^{-0.1445P}$.

Such ultrasonic welding is applied to a ultrasonic weld assembly in which the first member (3, 3a) is a pipe (3), the second member (4, 4a) is a pipe connection portion (4) and the ultrasonic welding is carried out to ultrasonically weld a flange portion (3a) of the pipe (3) to a flange portion (4a) of the connection portion (4).

As the first member (3, 3a) and the second member (4, 4a) constituting the ultrasonic weld assembly, those made of aluminum or an aluminum alloy can be used.

The present invention may be more fully understood from the description of preferred embodiments of the invention, as set forth below, together with the accompanying drawings.

DESCRIPTION OF THE PREFERRED EMBODIMENTS

Figure 1:
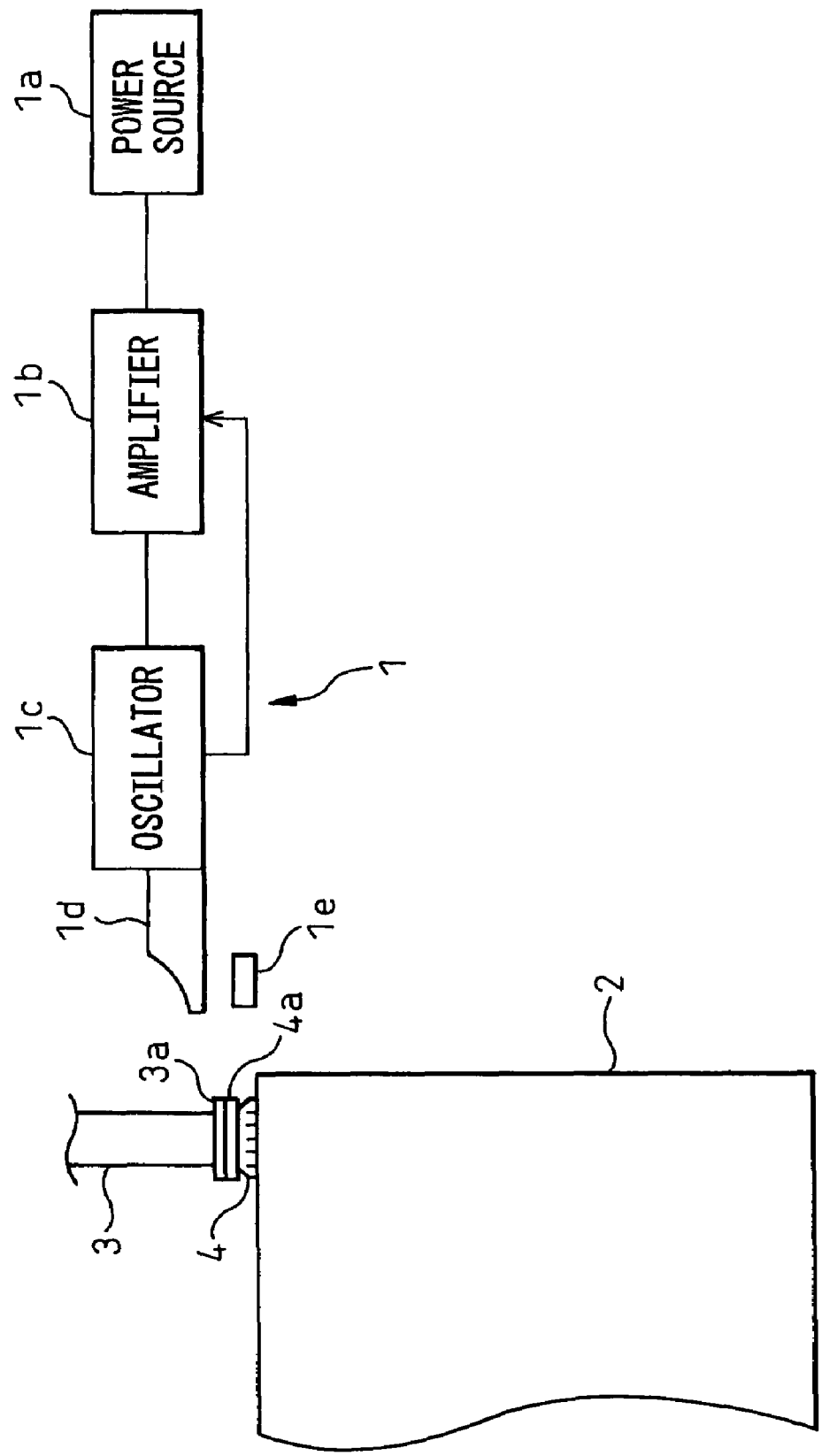
FIG. 1 is a schematic view of a ultrasonic welding apparatus according to a first embodiment of the invention.

Preferred embodiments of the invention will be hereinafter explained with reference to the accompanying drawings. Incidentally, like reference numerals will be used throughout the drawings to identify the same or equivalent portions in each of the following embodiments.

First Embodiment

A production method of a ultrasonic weld assembly by the application of the first embodiment of the invention will be explained with reference to a schematic view of FIG. 1 that uses a ultrasonic welding apparatus.

The ultrasonic welding apparatus 1 shown in FIG. 1 is used for welding a pipe 3 constituting a piping in an aluminum heater core 2, for example, and a pipe connection portion 4 for connecting the pipe 3 to the heater core 2. Here, the term "pipe 3" corresponds to a first member referred to in the invention and the term "connection portion 4" does to a second member.

As shown in the drawing, the ultrasonic welding apparatus 1 includes a power source 1a, an amplifier 1b, an oscillator 1c, a horn 1d and an anvil 1e.

The power source 1a supplies power to the amplifier 1b. The amplifier 1b receives the supply of power from the power source 1a and applies a high frequency voltage to the oscillator 1c. The oscillator 1c oscillates at a predetermined frequency such as 20 kHz by the high frequency voltage supplied from the amplifier 1b and by this oscillation, the horn 1d undergoes resonance at the predetermined frequency at which the oscillator 1c oscillates.

The anvil 1e and the horn 1d are used for clamping flange portions 3a and 4a of the pipe 3 and pipe connection portion 4 as the welded portions in this embodiment, and fixing during ultrasonic oscillation is achieved as these portions to be welded are clamped between the anvil 1e and the horn 1d.

Incidentally, each of the horn 1d and the anvil 1e has a distal end having a notch of a semi-arc shape, for example, and the pipe 3 and the pipe connection portion 4 are accommodated in these notches in such a fashion that almost the half of each flange portion 3a, 4a having a round shape is covered with the horn 1d and the anvil 1e. Therefore, in FIG. 1, for example, the right halves of the flange portions 3a and 4a of the pipe 3 and pipe connection portion 4 are first ultrasonically welded and then the left halves are ultrasonically welded. In this way, the entire circumferences of these pipe 3 and pipe connection portion 4 can be welded.

Figure 2:
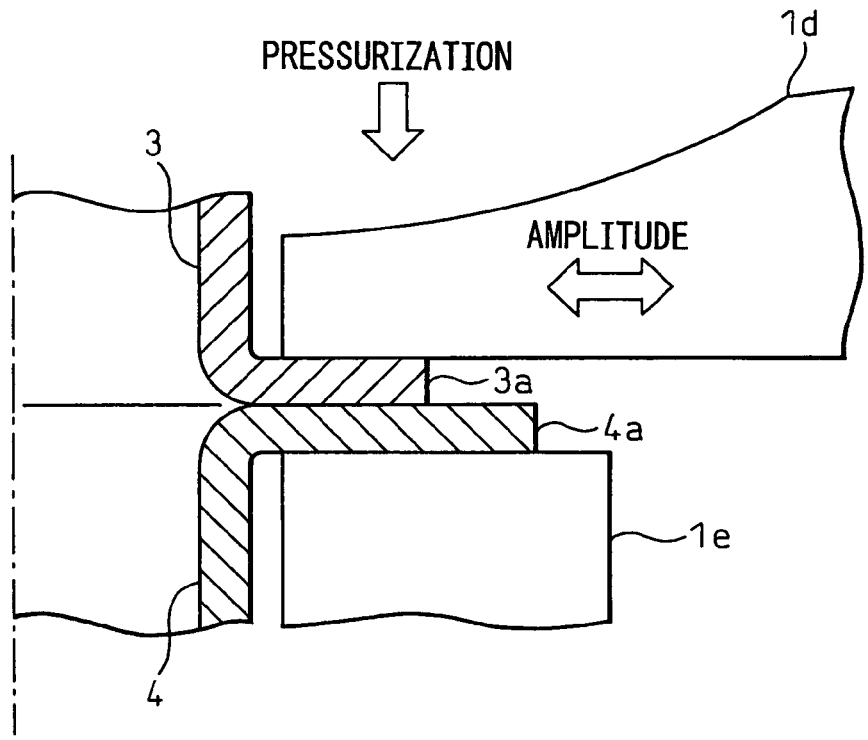
FIG. 2 is an enlarged sectional view of a welded portion in the ultrasonic welding apparatus shown in FIG. 1.

Ultrasonic welding is carried out by using the ultrasonic welding apparatus 1 having such a construction. As shown in FIG. 2, that is an enlarged sectional view of a portion at which ultrasonic welding is conducted, the flange portion 3a of the pipe 3 as the first member and the flange portion 4a of the pipe connection portion 4 as the second member are first arranged in such a manner that their weld surfaces keep mutual contact. Next, each flange portion 3a, 4a is clamped and fixed by the horn 1d and the anvil 1e.

The high frequency voltage is applied from the amplifier 1b to the oscillator 1c on the basis of the supply of power from the power source 1a to oscillate the oscillator 1c and to allow the horn 1d to resonate with the oscillation of the oscillator 1d. As a result, each flange portion 4a is pressurized in a vertical direction relative to the weld surfaces and is allowed to ultrasonically oscillate at predetermined amplitude in a direction parallel to the weld surfaces.

The oscillation of the oscillator 1c is fed back at this time to the amplifier 1b so that the amplitude of the ultrasonic oscillation is from 30 to 40 μm.

When ultrasonic welding is conducted by using such a ultrasonic oscillation, the inventors of this invention have found that the surface pressure for propagating the ultrasonic oscillation and the energy density have a close relation with accuracy of air-tight welding.

More concretely, the present inventors have conducted experiments for examining the weld condition between the pipe 3 and the pipe connection portion 4 by variously changing the surface pressure P for pressurizing each flange portion 3a, 4a and the energy density E used for ultrasonic oscillation when the flange portion 3a of the pipe 3 and the flange portion 4a of the pipe connection portion 4 are ultrasonically welded.

Figure 3:
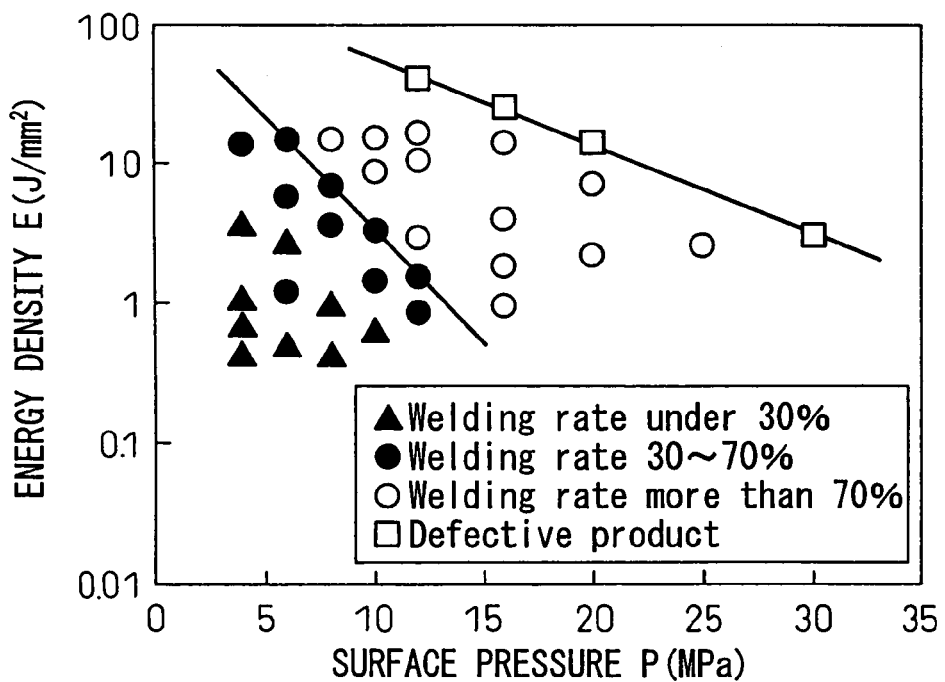
FIG. 3 is a graph showing an examination result of an energy density E with respect to a surface pressure P on a weld surface between a pipe and a pipe connection portion when ultrasonic oscillation is conducted at a sheet thickness t of 0.3 mm.
Figure 4:
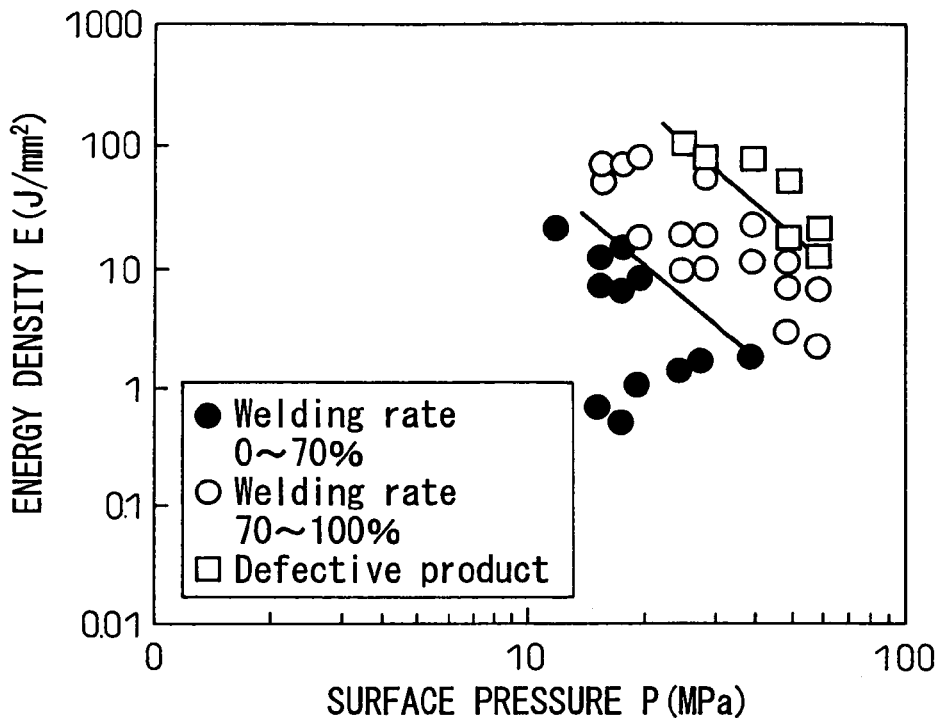
FIG. 4 is a graph showing an examination result of the energy density E with respect to the surface pressure P on the weld surface between the pipe and the pipe connection portion when ultrasonic oscillation is conducted at a sheet thickness t of 1.0 mm.
Figure 5:
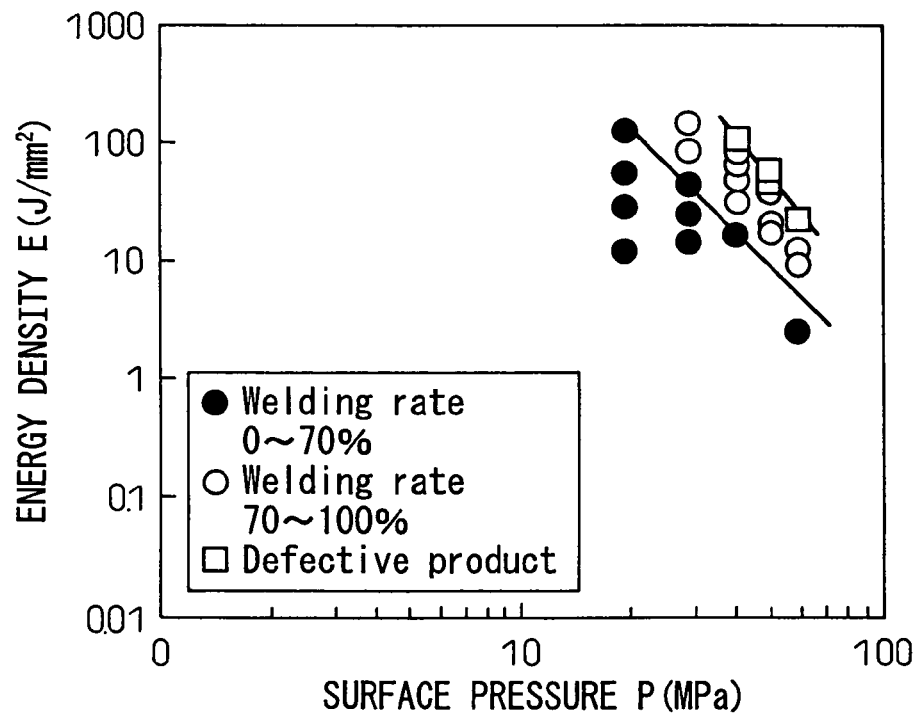
FIG. 5 is a graph showing an examination result of the energy density E with respect to the surface pressure P on the weld surface between the pipe and the pipe connection portion when ultrasonic oscillation is conducted at a sheet thickness t of 1.5 mm.

On the basis of the experiments, the inventors have further examined the relation of the energy density E with the surface pressure P on the weld surface of the pipe 3 and pipe connection portion 4 when ultrasonic oscillation is created, by changing variously the sheet thickness t of each flange portion 3a, 4a as the welding position. FIGS. 3 to 5 show the results of these experiments. FIG. 3 shows the result when the sheet thickness t of each flange portion 3a, 4a is 0.3 mm. FIG. 4 shows the result when the sheet thickness t of each flange portion 3a, 4a is 1.0 mm. FIG. 5 shows the result when the sheet thickness t of each flange portion 3a, 4a is 1.5 mm. Incidentally, the term "energy density E" hereby used means the quotient (E=Et/S) obtained by dividing total energy Et consumed on the weld surface between the pipe 3 as the first member and the pipe connection portion 4 as the second member by the weld surface S.

The term "welding rate" in the drawings represents the welding length to the magnitude of amplitude, that is, the proportion of the length of the portion ultrasonically welded in the amplitude direction. In FIGS. 3 to 5, black portions indicate those having a welding rate of less than 70% and white portions represent those having a welding rate of 70% or more. In FIG. 3 in which black triangles and round circles are used, the black triangles represent those having a welding rate of 30% or below and the black circles represent those having a welding rate of 30 to 70%. In FIGS. 3 to 5 in which white-painted circles and white-painted squares are shown used, both white circles and white squares represent those having a welding rate of 70%. However, the white squares represent the case where the welding rate is 70% or more but the surface pressure P or the energy density E is so great that a welding defect such as crushing of the flange portion 3a of the pipe 3 or the flange portion 4a of the pipe connection portion 4 occurs. Incidentally, each flange portion 3a, 4a can be mechanically welded within the range of the welding rate of 30 to 70% but this is the range in which sufficient airtightness cannot presumably be secured in some cases. When the welding rate exceeds 70%, each flange portion 3a, 4a can be mechanically welded and this is the range in which sufficient air-tightness can be secured, too.

It can be appreciated from these drawings that when the surface pressure P is small, a sufficient welding rate cannot be acquired unless the energy density E is made sufficiently great. When the surface pressure P is great, on the contrary, a sufficient welding rate can be acquired even when the energy density E is small, but the welding defect occurs when the energy density E is excessively great.

The boundary when the welding rate exceeds 30% can be expressed by a numerical expression as $E=26.69e^{-0.3708P}$ and the boundary when the welding rate exceeds 70% can be expressed as $E=133.45e^{-0.3708P}$, as shown in FIG. 3. The boundary when the welding defects occurs can be expressed as $E=240.9e^{-0.1445P}$.

Therefore, to set the welding rate to 30% or more, the energy density E must satisfy the relation $26.69e^{-0.3708P} < E$ and to set the welding rate to 70% or more, the relation $133.45e^{-0.3708P} < E$ must be satisfied. To eliminate the welding defect, the energy density E must satisfy the relation $E < 240.9e^{-0.1445P}$.

It has been confirmed that when the boundary where the welding rate exceeds 30%, the boundary where it exceeds 70% and the boundary where the welding defect occurs are formulated into the numerical expressions from FIGS. 4 and 5, the case where the welding rate is 30% or more, the case where it is 70% or more and the case where the welding defect occurs can be expressed by the following functions expressed by the surface pressure P and the sheet thickness t.

In other words, to acquire the welding rate of 30% or more, the energy density E must satisfy $E>J\times P^{-n}$, To acquire the welding rate of 70% or more, the energy density E must satisfy $E>K\times P^{-n}$. To eliminate the occurrence of the welding defect, the energy density E must satisfy $E<L\times P^{-m}$. Incidentally, symbols J, K and L are coefficients expressed by the sheet thickness t as a parameter and n and m are constants that can be obtained by plotting numerical values expressed by the numerical expressions of the boundaries when the welding rate is 30% or more, when it is 70% or more and when the welding defect occurs, respectively, that are determined from FIGS. 3 to 5, and by drawing an arbitrary line through the points plotted.

Figure 6:
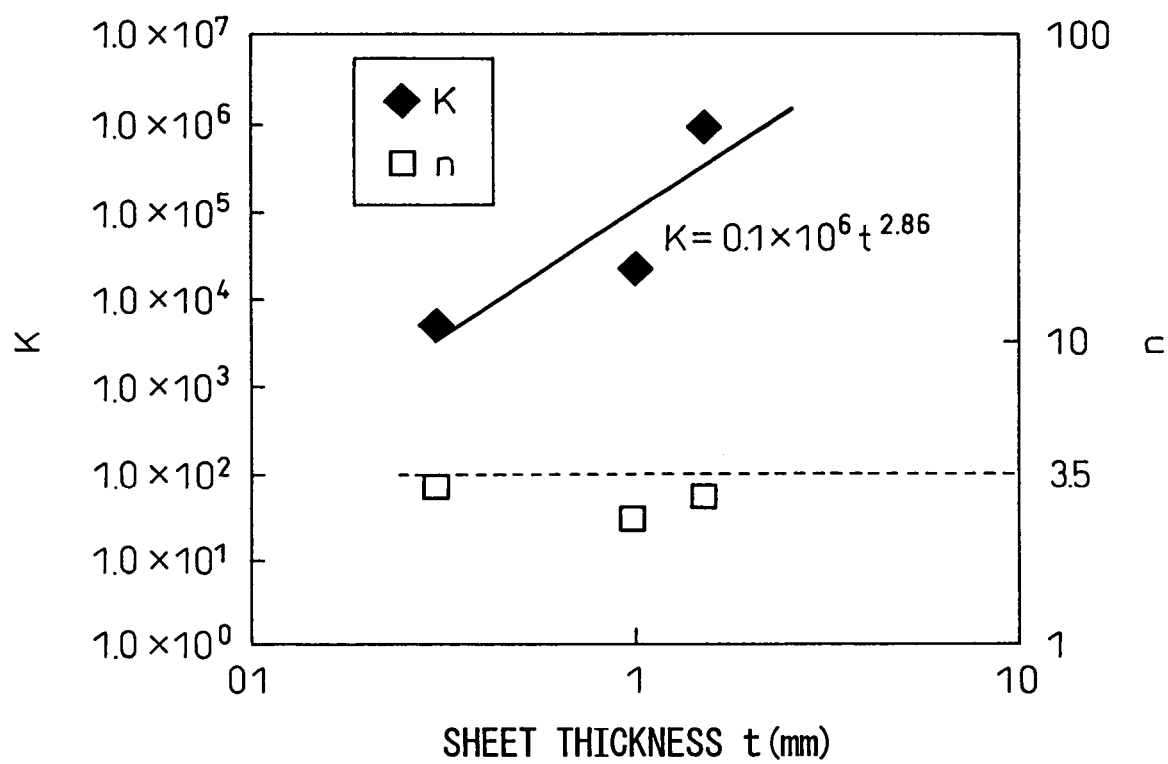
FIG. 6 is a graph showing the relation of a sheet thickness t with respect to the case where a welding rate is 70% or more and the case where welding defect occurs.
Figure 7:
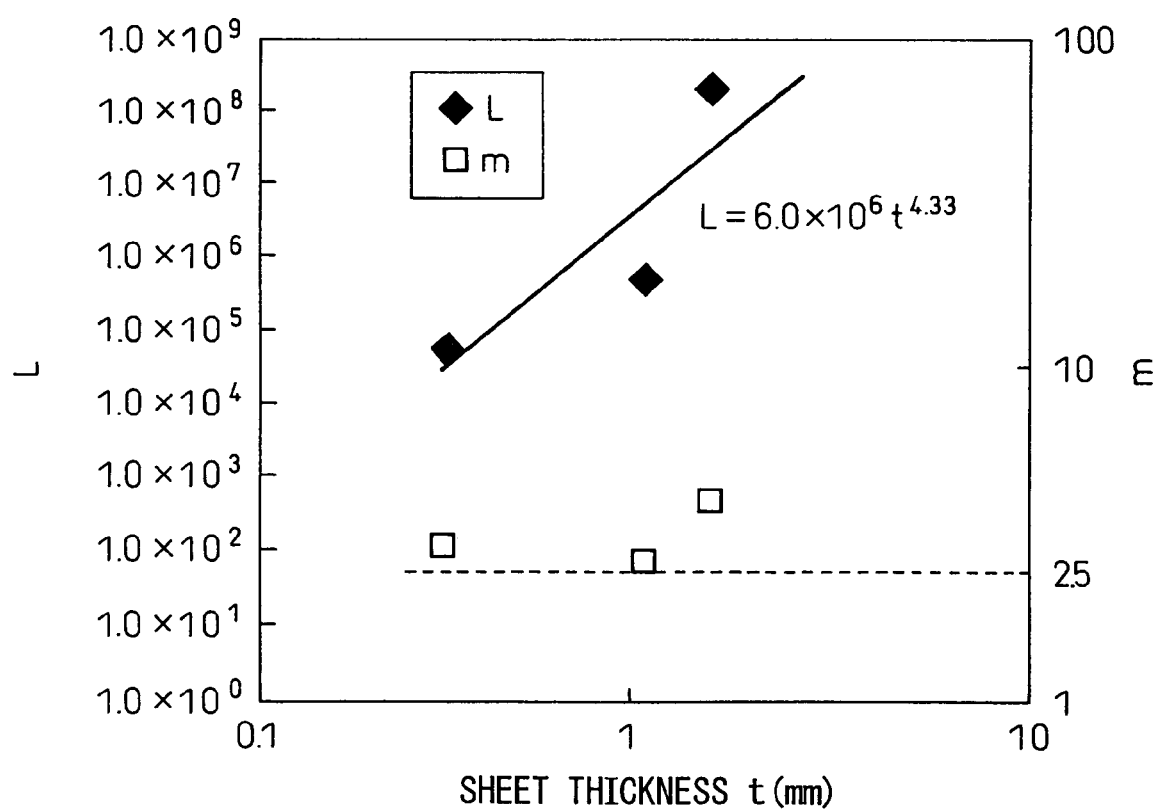
FIG. 7 is a graph showing the relation of a sheet thickness t with respect to the case where a welding rate is 70% or more and the case where a welding defect occurs.

FIGS. 6 and 7 show the relation with the sheet thickness t when the welding rate is 70% or more and when the welding defect occurs. These drawings represent the results obtained by plotting the numerical values of the numerical expressions of the boundaries when the welding rate is 70% or more and when the welding defect occurs, respectively, determined from FIGS. 3 to 5.

When arbitrary lines are drawn in these drawings, it is possible to determine K and L that change with the sheet thickness t as the parameter and n and m that do not much change with the sheet thickness t. When K, L, n and m are practically determined by using these drawings, the result of $K=10^5 t^{2.86}$, $L=10^6 t^{4.33}$, n=3.5 and m=2.5 can be obtained.

Though J is not written hereby, J, too, can be determined by the same method as that of K and L. When calculated practically, the result of $J=0.2\times 10^5 t^{2.86}$ can be obtained.

From the results described above, this embodiment sets the energy density E in accordance with the sheet thickness t of each flange portion 3a, 4a so that welding of each flange portion 3a, 4a can be precisely carried out.

More concretely, when the function of the energy density E represented by the relation between the surface pressure P and the sheet thickness t is defined as E(P, t), the minimum value Emin(P, t) of the energy density E necessary for insuring reliable welding is given by $Emin(P, t)=J\times P^{-n}$ because at least 30% of the welding rate is required. Further, the minimum valve Emin(P, t) of the energy density E necessary for insuring relaiably air-tight welding is given by $Emin(P, t)=K\times P^{-n}$ because at least 70% of the welding rate is required. To reliably eliminate the occurrence of the welding defect, the energy density E must be limited to $E<L\times P^{-m}$ and in this case, the energy density E has a maximum value Emax(P, t).

To satisfy this relation, the energy density E in ultrasonic welding is set to $Emin(P, t)=J\times P^{-n}<E(P, t)<Emax(P, t)=L\times P^{-m}$. To insure welding with more reliable air-tightness, the energy density E is preferably set to $Emin(P, t)=K\times P^{-n}<E(P, t)<Emax(P, t)=L\times P^{-m}$.

When the sheet thickness t of each flange portion 3a, 4a is 0.3 mm, for example, ultrasonic welding is carried out in such a manner that the energy density E satisfies the relation $26.69 e^{-0.3708P}<E$. According to this arrangement, an ultrasonic weld assembly having excellent air-tight welding can be produced. Furthermore, when ultrasonic welding is carried out in such a manner that the energy density E satisfies the relation $133.45 e^{-0.3708P}<E<240.9 e^{-0.1445P}$, a higher welding rate can be achieved. Therefore, production of the ultrasonic weld assembly having higher air-tightness welding can be produced.

Incidentally, Japanese Unexamined Patent Publication No. 2001-246479 describes that air-tight welding can be made by increasing the surface pressure P. However, excellent air-tight welding cannot always be made by merely increasing the surface pressure P, and the relation between the energy density E and the surface pressure P must be satisfied essentially in order to carry out excellent air-tight welding.

Though the case where the sheet thickness t of each flange portion 3a, 4a is 0.3 mm is represented as the concrete range of the numerical value of the energy density E, the ranges of the numerical values of the energy densities E can be determined by substituting t=1.0 and t=1.5 for the sheet thickness t in the energy density Emin(P, t) and Emax(P, t) to determine K and L, respectively.

Other Embodiments

In the embodiment described above, ultrasonic welding is carried out by setting the energy density E to satisfy the range described above, for example, by setting it in such a manner as to satisfy the relation $26.69 e^{-0.3708P}<E$ for the sheet thickness t of 0.3 mm, preferably the relation $133.45 e^{-0.3708P}<E<240.9 e^{-0.1445P}$.

However, because the weld length necessary for air-tight welding may vary depending on the work to be ultrasonically welded, it is possible to determine the proportion of the welding rate to be set from the relation between the energy density E and the surface pressure P shown in FIGS. 3 to 5 and to set the energy density E and the surface pressure P in such a manner as to satisfy the required welding rate. In this way, air-tight welding can be carried out satisfactorily in accordance with the object to be welded.

In the embodiment described above, the pipe 3 is the first member and the pipe connection portion 4 is the second member by way of example. However, they are merely examples and may be other members. Needless to say, the first and second members need not always be made of aluminum but may be made of other metals.

While the invention has been described by reference to specific embodiments chosen for purposes of illustration, it should be apparent that numerous modifications could be made thereto by those skilled in the art without departing from the basic concept and scope of the invention.

The invention claimed is:

1. A production method of a ultrasonic weld assembly, by conducting ultrasonic welding by ultrasonically oscillating a first member and a second member each made of a metal while a pressure is applied to said first and second members, wherein:

when a weld area of the weld surfaces between said first and second members is S and total energy consumed on said weld surfaces is Et during said ultrasonic welding, said ultrasonic welding is carried out to produce said ultrasonic weld assembly in such a manner that a function E(P, t) of an energy density E defined as the quotient obtained by dividing said total energy Et by said weld area S, which function E(P, t) is defined for a surface pressure P of the weld surfaces of said first and second members and a sheet thickness t of the weld portion of said first and second members, satisfies the relation $$Emin(P, t)=J\times P^{-n}<E(P, t)<Emax(P, t)=L\times P^{-m}$$

where $J=0.2\times 10^5 t^{2.86}$, n=3.5, $L=10^6 t^{4.33}$ and m=2.5.

2. A production method of a ultrasonic weld assembly according to claim 1, wherein ultrasonic welding is carried out in such a manner that the function E(P, t) of said energy density E satisfies the relation $$Emin(P, t)=K\times P^{-n}<E(P, t)<Emax(P, t)=L\times P^{-m}$$

where $K=10^5 t^{2.86}$ to produce said ultrasonic weld assembly.

3. A production method of a ultrasonic weld assembly according to claim 1, wherein said first member is a pipe, said second member is a pipe connection portion and said ultrasonic welding is carried out to ultrasonically weld a flange portion of said pipe to a flange portion of said connection portion.

4. A production method of a ultrasonic weld assembly according to claim 1, wherein both of said first and second members are made of aluminum or an aluminum alloy.

5. A production method, of a ultrasonic weld assembly by conducting ultrasonic welding by ultrasonically oscillating a first member and a second member each made of a metal while a pressure is applied to said first and second members, wherein:

when a weld area of the weld surface between said first and second members is S and total energy consumed on said weld surfaces is Et during said ultrasonic welding, said ultrasonic welding is carried out to produce said ultrasonic weld assembly in such a manner that an energy density E defined as the quotient obtained by dividing said total energy Et by said weld area S satisfies the relation given below with a surface pressure P on the weld surfaces of said first and second members when a sheet thickness t of the weld portion of said first and second members is 0.3 mm:

$$26.69e^{-0.3708P} < E < 240.9e^{-0.1445P}.$$

6. A production method of a ultrasonic weld assembly according to claim 5, wherein ultrasonic welding is carried out to produce said ultrasonic weld assembly in such a manner that said energy density E satisfies the relation given below with said surface pressure P on the weld surface of said first and second members:

$$133.45e^{-0.3708P} < E < 240.9e^{-0.1445P}.$$

7. A production method of a ultrasonic weld assembly according to claim 5, wherein said first member is a pipe, said second member is a pipe connection portion and said ultrasonic welding is carried out to ultrasonically weld a flange portion of said pipe to a flange portion of said connection portion.

8. A production method of a ultrasonic weld assembly according to claim 5, wherein both of said first and second members are made of aluminum or an aluminum alloy.

* * * * *